United States Patent
Hou

(10) Patent No.: US 8,886,150 B2
(45) Date of Patent: Nov. 11, 2014

(54) NARROWBAND INTERFERENCE DETECTOR

(75) Inventor: Wen-Sheng Hou, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 631 days.

(21) Appl. No.: 13/194,987

(22) Filed: Jul. 31, 2011

(65) Prior Publication Data
US 2013/0028358 A1     Jan. 31, 2013

(51) Int. Cl.
*H04B 1/10*     (2006.01)

(52) U.S. Cl.
CPC .......................................... *H04B 1/10* (2013.01)
USPC .......................................... 455/296; 455/226.1

(58) Field of Classification Search
CPC .......... H04B 1/10; H04B 1/16; H04B 1/1027; H04B 1/1036
USPC ............. 455/67.1, 67.13, 68, 226.1, 296, 307
See application file for complete search history.

(56) References Cited

U.S. PATENT DOCUMENTS

| | | | |
|---|---|---|---|
| 6,937,676 B2 * | 8/2005 | Takada et al. .................. 375/346 |
| 7,899,428 B2 * | 3/2011 | Rofougaran ................... 455/307 |
| 8,254,505 B2 * | 8/2012 | Tsuie ............................ 375/346 |
| 8,345,808 B2 * | 1/2013 | Ye et al. ........................ 375/348 |
| 8,417,204 B2 * | 4/2013 | Rofougaran et al. ......... 455/266 |
| 2004/0062216 A1 | 4/2004 | Nicholls |
| 2009/0280766 A1 | 11/2009 | Rofougaran |
| 2010/0246635 A1 | 9/2010 | Ye |
| 2011/0116536 A1 | 5/2011 | Tsuie |
| 2012/0004005 A1 * | 1/2012 | Ahmed et al. ................ 455/522 |
| 2012/0083236 A1 * | 4/2012 | Thomas et al. ............... 455/296 |
| 2013/0010810 A1 * | 1/2013 | Pelet ............................ 370/479 |

* cited by examiner

*Primary Examiner* — Blane J Jackson
(74) *Attorney, Agent, or Firm* — Winston Hsu; Scott Margo

(57) ABSTRACT

The present invention discloses a narrow band interference detector for a receiver of a communication system. The narrow band interference detector includes a numerically-controlled oscillator (NCO), for generating an oscillating signal according to a time-variable frequency; a mixer, for mixing an input signal with the oscillating signal, to generate a mixed signal; a phase lock loop (PLL), for locking the mixed signal during a detection period according to the time-variable frequency; a first switch, for controlling a connection between the NCO and the PLL according to a desirable narrow band interference signal type of the at least one narrow band interference signal; and a narrow band determination unit, for determining at least one narrow band interference signal according to a low frequency component of the mixed signal, the time-variable frequency and the desirable narrow band interference signal type of the at least one narrow band interference signal.

17 Claims, 3 Drawing Sheets

NARROWBAND INTERFERENCE DETECTOR

BACKGROUND OF THE INVENTION

1. Field of the Invention

The present invention relates to a narrow band interference detector, and more particularly, to a narrow band interference detector for a receiver of a communication system to detect narrow band interference signals in time domain.

2. Description of the Prior Art

Global positioning system (GPS) is an accurate navigation system and generally used in civilian or military applications. The performance of GPS receiver is usually degraded by intentional or unintentional narrow band interference signals in input signals. The narrow band interference signals may reduce signal to noise ratio (SNR) of a receiver of a GPS system, cause satellite determination error, increase Time to First Fix (TTFF), and lower navigation accuracy, etc. Therefore, the receiver is generally required to detect and cancel the narrow band interference signals.

A conventional narrow band interference detector of the GPS receiver generally applies fast Fourier transform (FFT) to detect frequencies of the narrow band interference signals in a frequency domain (FD), and thus a conventional narrow band interference canceller of the GPS receiver can utilize time domain (TD) notch filters or FD notch filters to cancel the narrow band interference signals from the input signal.

However, since the conventional narrow band interference detector applies FFT to detect the frequencies of the narrow band interference signals in the FD, when a narrow band interference signal type of an narrow band interference signal is an unmodulated signal (e.g. only one pure tone), the conventional narrow band interference detector needs to apply excess FFT numbers (i.e. excess cost) for accuracy, to avoid estimate error of the frequency of the unmodulated signal resulted from limited FFT numbers.

SUMMARY OF THE INVENTION

It is therefore an objective of the present invention to provide a narrow band interference detector for a receiver of a communication system capable of detecting narrow band interference signals in time domain.

The present invention discloses a narrow band interference detector for a receiver of a communication system. The narrow band interference detector includes a numerically-controlled oscillator (NCO), for generating an oscillating signal according to a time-variable frequency; a mixer, for mixing an input signal with the oscillating signal, to generate a mixed signal; a phase lock loop (PLL), for locking the mixed signal during a detection period according to the time-variable frequency; a first switch, for controlling a connection between the NCO and the PLL according to a desirable narrow band interference signal type of the at least one narrow band interference signal; and a narrow band determination unit, for determining at least one narrow band interference signal according to a low frequency component of the mixed signal, the time-variable frequency and the desirable narrow band interference signal type of the at least one narrow band interference signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
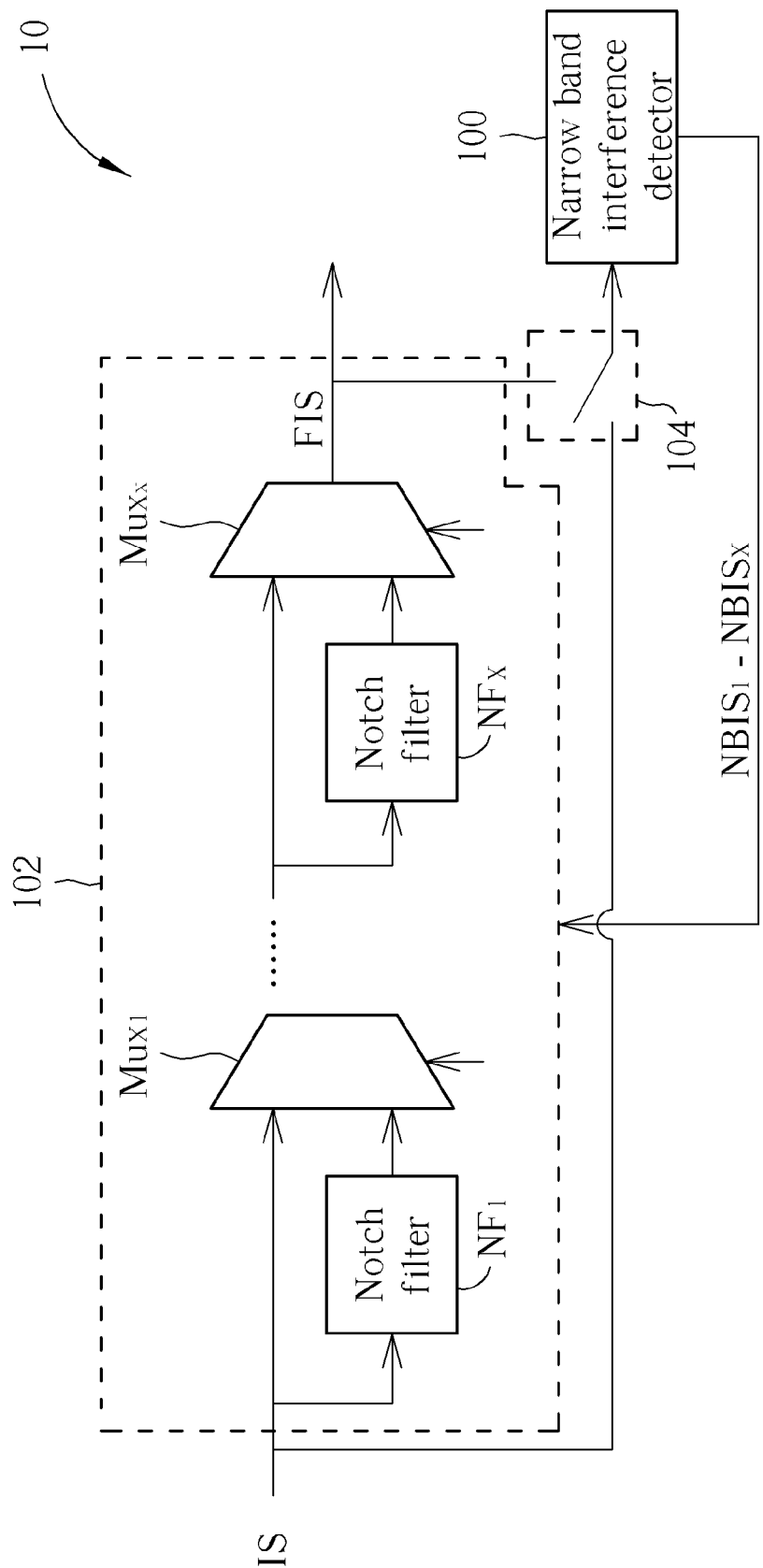
FIG. 1 is a schematic diagram a receiver of a communication system according to an embodiment of the present invention.

Please refer to FIG. 1, which is a schematic diagram a receiver 10 of a communication system according to an embodiment of the present invention, wherein the communication system is preferably a Global positioning system (GPS). As shown in FIG. 1, the receiver 10 includes a narrow band interference detector 100 and a narrow band interference canceller 102, and in other embodiments, the receiver 10 may further include an analog to digital converter (ADC) or other devices. The narrow band interference detector 100 detects narrow band interference signals $NBIS_1$-$NBIS_x$ of an input signal IS in a time domain (TD), and the narrow band interference canceller 102 can cancel the narrow band interference signals $NBIS_1$-$NBIS_x$ from the input signal IS to output a filtered input signal FIS accordingly. As a result, the receiver 10 can accurately detect the narrow band interference signals $NBIS_1$-$NBIS_x$ in the TD and cancel the narrow band interference signals $NBIS_1$-$NBIS_x$ from the input signal IS accordingly rather than applying excess FFT numbers (i.e. excess cost) in a frequency domain (FD) to accurately detect narrow band interference signals.

Figure 2A:
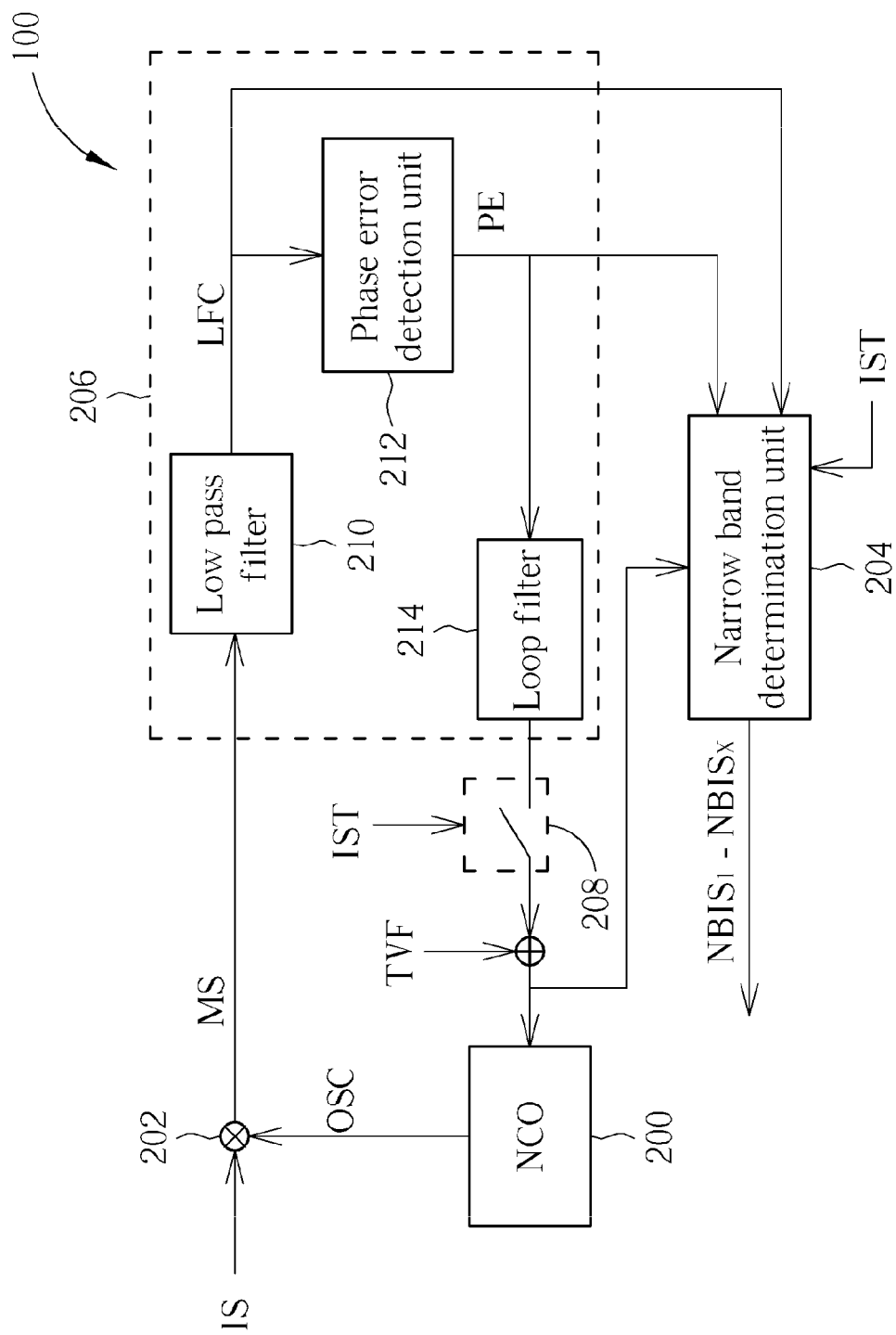
FIG. 2A is a schematic diagram of a narrow band interference detector shown in FIG. 1 according to an embodiment of the present invention.

Specifically, please refer to FIG. 2A, which is a schematic diagram of the narrow band interference detector 100 shown in FIG. 1 according to an embodiment of the present invention. As shown in FIG. 2A, the narrow band interference detector 10 includes a numerically-controlled oscillator (NCO) 200, a mixer 202, a narrow band determination unit 204, a phase lock loop (PLL) 206 and a switch 208. In short, the NCO 200 generates an oscillating signal OSC according to a time-variable frequency TVF. The mixer 202 mixes the input signal IS with the oscillating signal OSC, to generate a mixed signal MS. The PLL 206 locks the mixed signal MS during a detection period according to the time-variable frequency TVF.

The switch 208 controls a connection between the NCO 200 and the PLL 206 according to a desirable narrow band interference signal type (i.e. a modulated signal or an unmodulated signal) of the narrow band interference signals $NBIS_1$-$NBIS_x$, wherein the switch 208 is controlled by an interference signal type indicating signal IST indicating the desirable narrow band interference signal type is modulated or unmodulated. The narrow band determination unit 204 determines the narrow band interference signals $NBIS_1$-$NBIS_x$ according to a low frequency component LFC of the mixed signal MS, the time-variable frequency TVF and the desirable narrow band interference signal type of the narrow band interference signals $NBIS_1$-$NBIS_x$, wherein the narrow band determination unit 204 derives the desirable narrow band interference signal type from the interference signal type indicating signal IST. As a result, the narrow band interference detector 100 can control the switch 208 to enable phase-lock operations of the PLL 206 according to whether a desirable narrow band interference signal type is a modulated signal or an unmodulated signal, so as to detect the narrow band interference signals $NBIS_1$-$NBIS_x$ in the TD.

Figure 2B:
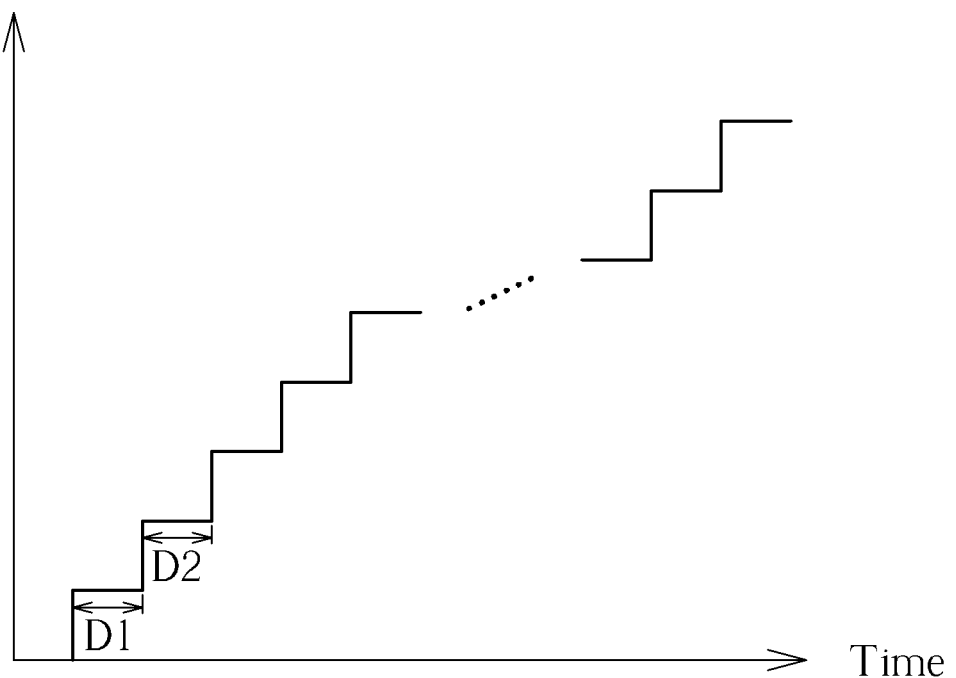
FIG. 2B is a schematic diagram of a time-variable frequency shown in FIG. 2A.

In detail, please refer to FIG. 2B, which is a schematic diagram of the time-variable frequency TVF shown in FIG. 2A. As shown in FIG. 2B, the time-variable frequency TVF is fixed during a detection period D1, and the time-variable frequency TVF during the detection period D1 is lower than the time-variable frequency TVF during a next detection period D2 and so on. In other words, the time-variable frequency TVF is corresponding to a specific frequency in each detection period.

Under such a situation, please continue to refer to FIG. 2A, the PLL 206 includes a low pass filter 210, a phase error detection unit 212, and a loop filter 214. The low pass filter 210 passes the low frequency component LFC of the mixed signal MS. The phase error detection unit 212 detects a phase error PE according to the low frequency component LFC of the mixed signal MS. The loop filter 214 compensates the phase error PE. In other words, the low frequency component LFC is corresponding to a specific frequency component of the input signal IS in each detection period since the mixer 202 mixes the input signal IS with the oscillating signal OSC of the time-variable frequency TVF to generate the mixed signal MS and the time-variable frequency TVF is corresponding to the specific frequency in each detection period.

Therefore, when the desirable narrow band interference signal type of the narrow band interference signals $NBIS_1$-$NBIS_x$ is an unmodulated signal, which has only one pure tone and very narrow bandwidth, the switch 208 conducts the connection between the NCO 200 and the PLL 206, to enable phase-lock operations of the PLL 206. Under such a situation, if the PLL 206 locks the mixed signal MS, i.e. the phase error PE is zero, according to the time-variable frequency TVF during the detection period, the narrow band determination unit 204 determines a frequency $F_a$ and a level $L_a$ of a narrow band interference signal $NBIS_a$ of the narrow band interference signals $NBIS_1$-$NBIS_x$ according to the low frequency component LFC and the time-variable frequency TVF (i.e. the frequency $F_a$). As a result, the narrow band interference detector 10 can accurately detect a frequency and a level of an unmodulated signal.

On the other hand, when the desirable narrow band interference signal type of the narrow band interference signals $NBIS_1$-$NBIS_x$ is a modulated signal, which has a broad bandwidth, the switch 208 does not conduct the connection between the NCO 200 and the PLL 206, to disenable phase-lock operations of the PLL 206. Under such a situation, if a level of the low frequency component LFC of the mixed signal MS is higher than a threshold TH1, the narrow band determination unit 204 determines a center frequency $F_b$, a bandwidth BW and a level $L_b$ of a narrow band interference signal $NBIS_b$ of the narrow band interference signals $NBIS_1$-$NBIS_x$. As a result, the narrow band interference detector 10 can accurately detect a frequency, a bandwidth and a level of a modulated signal.

Please continue to refer to FIG. 1, after the narrow band interference detector 10 detects frequencies, bandwidths (only for modulated signals) and levels of the narrow band interference signals $NBIS_1$-$NBIS_x$, the narrow band interference canceller 102 can cancel the narrow band interference signals $NBIS_1$-$NBIS_x$ from the input signal IS to output the filtered input signal FIS according to levels of the narrow band interference signals $NBIS_1$-$NBIS_x$ and a threshold TH2. For example, if a level $L_c$ of a narrow band interference signal $NBIS_c$ is higher than the threshold TH2, the narrow band interference canceller cancels the narrow band interference signal $NBIS_c$ of the narrow band interference signals $NBIS_1$-$NBIS_x$ from the input signal IS.

In detail, the narrow band interference canceller 102 includes notch filters $NF_1$-$NF_x$ and multiplexer $Mux_1$-$Mux_x$. The notch filter $NF_d$ filters the narrow band interference signal $NBIS_d$ of the narrow band interference signals $NBIS_1$-$NBIS_x$ to generate a filtered signal $FS_d$. The multiplexer $Mux_d$ receives a previous output signal $OS_{d-1}$ of a previous multiplexer $Mux_{d-1}$ at a first input terminal and the filtered signal $FS_d$ at a second input terminal, and outputs an output signal $OS_d$ according to a level $L_d$ of the narrow band interference signal $NBIS_d$ and the threshold TH2. For example, if the level $L_d$ of the narrow band interference signal $NBIS_d$ is higher than the threshold TH2, the multiplexer $Mux_d$ outputs the filtered signal $FS_d$ as the output signal $OS_d$. By the same token, the narrow band interference canceller 102 can utilize the notch filter $NF_1$-$NF_x$ and the multiplexer $Mux_1$-$Mux_x$ to cancel the narrow band interference signals $NBIS_1$-$NBIS_x$ from the input signal IS to output a filtered input signal FIS according to levels of the narrow band interference signals $NBIS_1$-$NBIS_x$ and a threshold TH2. As a result, the narrow band interference canceller 102 can utilize corresponding notch filters with narrow bandwidths to cancel narrow band interference signals from the input signal IS without damaging other frequency components of the input signal IS too much.

Besides, the receiver 10 can further include a switch 104, for controlling connections between the narrow band interference detector 100 and the input signal IS and the filtered input signal FIS, to output the filtered input signal FIS to the narrow band interference detector 100 according to whether the filtered input signal FIS is generated. Specifically, when the receiver 10 first receives the input signal IS, the receiver 10 conducts the connection between the narrow band interference detector 10 and the input signal IS, and thus the narrow band interference detector 100 can detect the narrow band interference signals $NBIS_1$-$NBIS_x$, such that the narrow band interference canceller 102 can cancel the narrow band interference signal $NBIS_c$ of the narrow band interference signals $NBIS_1$-$NBIS_x$ from the input signal IS accordingly, to output the filtered input signal FIS.

After the filtered input signal FIS is generated, the receiver 10 can conduct the connection between the narrow band interference detector 100 and the filtered input signal FIS, to output the filtered input signal FIS to the narrow band interference detector 100, such that the narrow band interference detector 100 can determine remained narrow band interference signals $NBIS_1$-$NBIS_y$ of weaker levels according to the filtered input signal $NBIS_1$-$NBIS_x$ since the narrow band interference detector 100 may only determine the narrow band interference signals $NBIS_1$-$NBIS_x$ of stronger levels in the first round of detection.

Noticeably, the spirit of the invention is to detect the narrow band interference signals $NBIS_1$-$NBIS_x$ in the TD according to the time-variable frequency TVF and cancel the narrow band interference signals $NBIS_1$-$NBIS_x$ from the input signal IS accordingly. Those skilled in the art should make modifications or alterations accordingly. For example, since GPS signals are weak relative to narrow band interference signals and transmitted band, the receiver 10 for a GPS system only needs to cancel the narrow band interference signals $NBIS_1$-$NBIS_x$ from the input signal IS. However, for other communications, the narrow band interference canceller 102 does not cancel a frequency component among an operating frequency of the communication system from the input signal IS, to prevent transmitted signals from being cancelled. Besides, the time-variable frequency TVF is not limited to vary over times as shown in FIG. 2B, as long as a specific frequency is corresponding to a specific detection period, such that the narrow band interference detector 100 can detect the narrow band interference signals $NBIS_1$-$NBIS_x$ of an input signal IS in the TD according to the time-variable frequency TVF.

In the prior art, when a narrow band interference signal type is an unmodulated signal, the conventional narrow band interference detector needs to apply excess FFT numbers (i.e. excess cost) for accuracy. In comparison, the present invention can accurately detect the narrow band interference signals $NBIS_1$-$NBIS_x$ in the TD according to the time-variable frequency TVF and cancel the narrow band interference signals $NBIS_1$-$NBIS_x$ from the input signal IS accordingly without excess cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A narrow band interference detector for a receiver of a communication system, the narrow band interference detector comprising:
    a numerically-controlled oscillator (NCO), for generating an oscillating signal according to a time-variable frequency;
    a mixer, for mixing an input signal with the oscillating signal, to generate a mixed signal;
    a phase lock loop (PLL), for locking the mixed signal during a detection period according to the time-variable frequency;
    a first switch, for controlling a connection between the NCO and the PLL according to a desirable narrow band interference signal type of the at least one narrow band interference signal; and
    a narrow band determination unit, for determining at least one narrow band interference signal according to a low frequency component of the mixed signal, the time-variable frequency and the desirable narrow band interference signal type of the at least one narrow band interference signal.

2. The narrow band interference detector of claim 1, wherein the time-variable frequency is fixed during a detection period, and the time-variable frequency during the detection period is lower than the time-variable frequency during a next detection period.

3. The narrow band interference detector of claim 1, wherein the desirable narrow band interference signal type is a modulated signal or an unmodulated signal.

4. The narrow band interference detector of claim 3, wherein the first switch does not conduct the connection between the NCO and the PLL when the desirable narrow band interference signal type of the narrow band interference is a modulated signal.

5. The narrow band interference detector of claim 1, wherein the PLL comprising:
    a low pass filter, for passing the low frequency component of the mixed signal;
    a phase error detection unit, for detecting a phase error according to the low frequency component of the mixed signal; and
    a loop filter, for compensating the phase error.

6. The narrow band interference detector of claim 5, wherein when the desirable narrow band interference signal type of the narrow band interference is a modulated signal, the narrow band determination unit determines a second frequency, a bandwidth and a second level of a second narrow band interference signal of the at least one narrow band interference signal if a level of the low frequency component of the mixed signal is higher than a first threshold.

7. The narrow band interference detector of claim 1, wherein the first switch conducts the connection between the NCO and the PLL when the desirable narrow band interference signal type of the at least one narrow band interference signal is an unmodulated signal.

8. The narrow band interference detector of claim 7, wherein the narrow band determination unit determines a first frequency and a first level of a first narrow band interference signal of the at least one narrow band interference signal if the PLL locks the mixed signal according to the time-variable frequency during the detection period.

9. The narrow band interference detector of claim 1, wherein the receiver further comprises a narrow band interference canceller, for cancelling the at least one narrow band interference signal from the input signal to output a filtered input signal according to at least one level of the at least one narrow band interference signal and a second threshold.

10. The narrow band interference detector of claim 9, wherein the narrow band interference canceller cancels a third narrow band interference signal of the at least one narrow band interference signal from the input signal if a third level of the third narrow band interference signal is higher than the second threshold.

11. The narrow band interference detector of claim 9, wherein the narrow band interference canceller comprises:
    at least one notch filter, each for filtering one of the at least one narrow band interference signal to generate one of at least one filtered signal; and
    at least one multiplexer, each for receiving a previous output signal of a previous multiplexer at a first input terminal and the one of the least one filtered signal at a second input terminal, and outputting one of at least one output signal according to a level of the one of the at least one narrow band interference signal and the second threshold.

12. The narrow band interference detector of claim 11, wherein the each of the at least one multiplexer outputs the one of at least one filtered signal as the one of at least one output signal when the level of the one of the at least one narrow band interference signal is higher than the second threshold.

13. The narrow band interference detector of claim 9, wherein the narrow band interference canceller does not cancel a frequency component among an operating frequency of the communication system from the input signal.

14. The narrow band interference detector of claim 1, wherein the receiver further comprises a second switch, for controlling connections between the narrow band interference detector and the input signal and the filtered input signal to output the filtered input signal to the narrow band interference detector according to whether the filtered input signal is generated.

15. The narrow band interference detector of claim 14, wherein the second switch conducts the connection between the narrow band interference detector and the filtered input signal, to output the filtered input signal to the narrow band interference detector if the filtered input signal is generated.

16. The narrow band interference detector of claim 15, wherein the narrow band interference detector determines at least one remained narrow band interference signal according to the filtered input signal.

17. The narrow band interference detector of claim 1, wherein the communication system is a GPS communication system.

* * * * *